May 24, 1960 W. MARGULIS ET AL 2,937,595
ROCKET BOOSTERS
Filed May 18, 1955
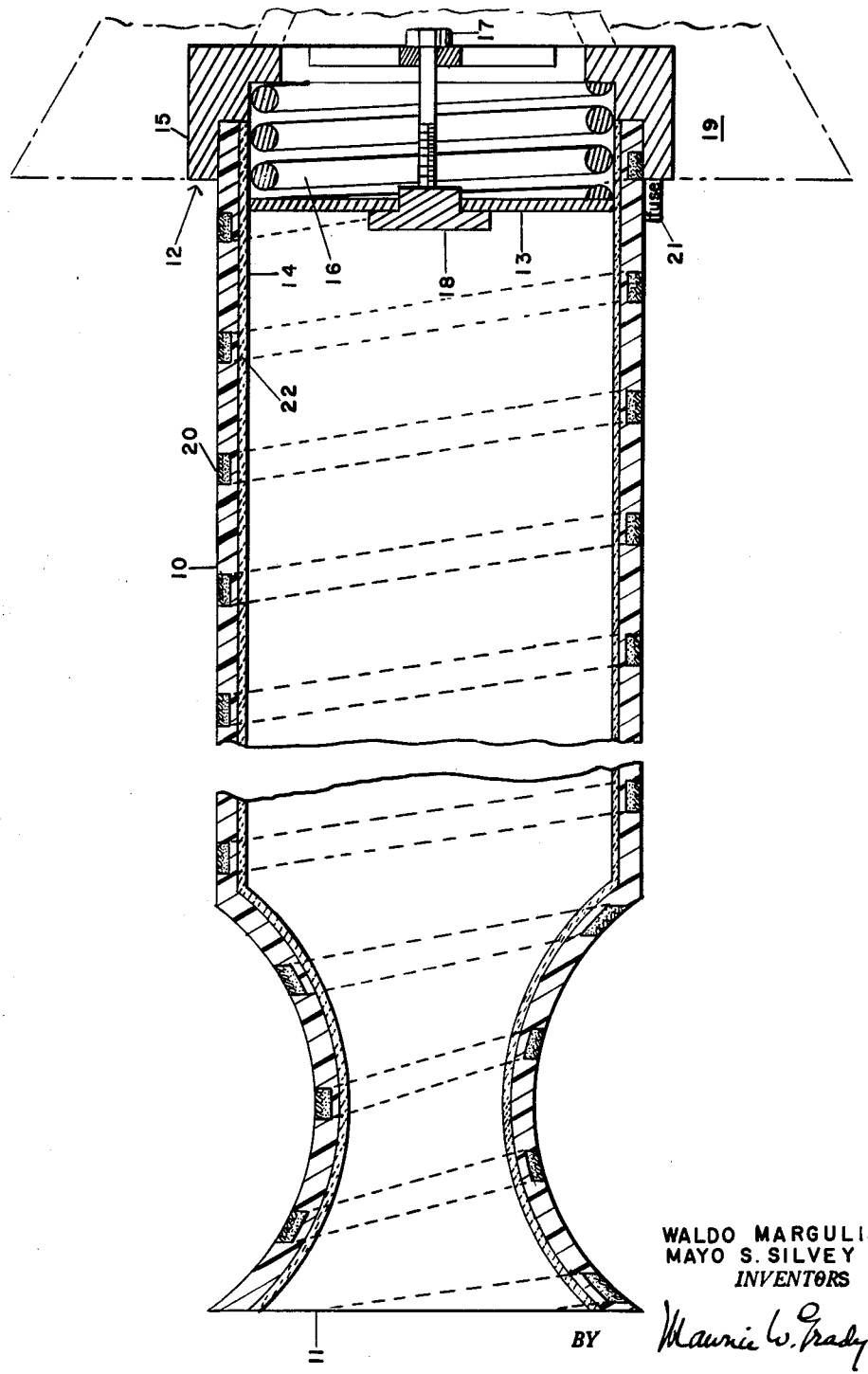
WALDO MARGULIS
MAYO S. SILVEY
INVENTORS
BY *Maurice W. Grady*
ATTORNEY

United States Patent Office 2,937,595
Patented May 24, 1960

2,937,595
ROCKET BOOSTERS

Waldo Margulis, Albany, and Mayo S. Silvey, Schenectady, N.Y., assignors to Alco Products, Inc., New York, N.Y., a corporation of New York Filed May 18, 1955, Ser. No. 509,292

4 Claims. (Cl. 102—49)

This invention relates to rocket boosters or to the jet assisted take-off (JATO) units for use with rockets, guided missiles, and aircraft.

The function of a JATO unit or booster is to furnish a strong burst of power for a relatively short period of time to cause a missile or aircraft to become airborne. Such a booster must impel the missile to a sufficient altitude and impart to it a sufficient velocity so that the basic power plant of the missile or aircraft can be brought into operation to supply its power for the continued flight of the assisted unit. The JATO unit of course carries its own fuel supply and when this has become exhausted, it is desirable that the unit be jettisoned. It no longer serves any useful purpose but instead acts as an encumbrance to the further flight of the missile or aircraft. The exhausted unit is dropped from a high altitude, usually several thousand feet, and it becomes a serious hazard to lives and property in the area below. These hazardous conditions are particularly prevalent when guided missiles are used for the anti-aircraft defense or populated communities or when they are fired at an enemy from a position behind friendly troops. Similar conditions exist when the JATO unit is used for launching aircraft from landing fields which are usually surrounded by buildings.

The principal object of the invention is therefore to provide a jet assisted take-off (JATO) unit or booster, which can be jettisoned from its associated missile or aircraft and then be immediately disintegrated so that it will fall to the ground in small relatively harmless pieces.

Another object is to provide such a frangible booster which includes a container having built-in explosive material adapted to destroy the booster, such explosive being ignited by means activated by the mechanism which jettisons the booster from the missile or aircraft assisted.

Another object is to provide such a booster which includes a container made of a material such as plastic which, when fragmented, will fall to the ground in small lightweight pieces that will be harmless to lives and property.

Other and further objects of the present invention will be apparent from the following description, the accompanying drawing and the appended claims.

In the drawing, the JATO unit or booster of the invention is shown in foreshortened longitudinal section connected to a missile illustrated only diagrammatically.

In the drawing the booster is shown as comprising a hollow cylindrical body 10 adapted to carry a charge of propellant. The trailing end of the booster, which is to the left in the figure, is provided with a nozzle 11 and the leading end is equipped with a closure, generally indicated at 12, which includes means to jettison the booster, the jettisoning means forms no part of the invention but it may be described briefly as comprising a plate 13 secured to the wall 14 of the booster body, an annular closure 15 having a close sliding fit with the periphery of the body, a coil spring 16 between the closure and plate, a bolt 17 extending through the closure and plate, and a fusible anchor nut 18. The device is assembled by tightening the bolt to the position shown in the drawing so that the closure 15 is drawn into seated position on the body to compress the spring. At a predetermined time, fusible nut 18 will be melted, as later described, bolt 17 will be released, and the expanding action of spring 16 will follow to drive the body 10 and cover 15 apart thus to jettison the body from its associated missile (indicated diagrammatically as 19).

The main body of the booster is constructed of reinforced plastic. In the prior art, booster bodies have been made of metal alloys, but bodies of such material have the disadvantage that they fall to the ground either as destructive heavy weights or as fragmented pieces which are similar to shrapnel. The class of plastic preferred for the body or container of the invention is resin such as epoxy, phenolic, or polyester, or combinations thereof. Reinforcement is provided by fibrous material such as fiber glass, asbestos, or sisal, which may be fabricated in layers and assembled by conventional methods.

The body 10 is manufactured either by molding, casting, or lay-up. An explosive in the form of explosive cord 20 is embedded in the body if the latter is molded or cast. The cord may, however, be wrapped around the body in case the latter is fabricated by lay-up methods. If the cord is wrapped around the body, an additional layer or a plurality of layers may be provided on the exterior surface as reinforcement. The explosive cord is shown as arranged helically around the body, but other arrangements may be used and fall within the scope of the invention. At its inner end the cord is disposed in contact with a delay fuse or detonator 21 carried by body 10. After the plastic of the body has been cured, its inside surface is coated with a ceramic material 22 which serves as a thermal buffer. The thickness of the ceramic can be varied to meet different high temperature requirements.

In operation, the propellant is ignited at the nozzle end of the container by conventional means and the gases generated by the combustion are discharged through the nozzle to propel the booster and missile on its course of flight. The propellant is consumed in a wave front which moves through the container away from the nozzle. The ceramic liner 22 affords protection to the plastic and serves to prevent ignition of the explosive cord 20 by the burning propellant. When the flame wave reaches the fusible anchor nut 18, the latter is consumed and the container is jettisoned in the manner previously described. The jettisoning release action separates the body 10 from the cover 15 and the associated missile. This separating action ignites the fuse 21, which is secured to body 10, and the explosive cord is ignited by the fuse. The explosive action of the cord to disintegrate and destroy the container is obvious. The plastic material of the container and the ceramic liner lend themselves to easy destruction.

While there has been hereinbefore described an approved embodiment of this invention, it will be understood that various changes and modifications in form, arrangement of parts and details of construction thereof may be made without departing from the spirit of the invention and that all such changes and modifications as fall within the scope of the appended claims are contemplated as a part of this invention.

What we claim is:

1. In a booster for a rocket or the like of the class in which the booster is jettisoned from the rocket; a container to carry a charge of propellant; means on the container to explode to destroy the container; a detonator for such explosive means; a mechanism to jettison the booster from the rocket including a transverse plate attached to the container, a closure for the container disposed opposite the plate, said closure having a sliding fit on the periphery of the container, a coil spring between the plate and closure, bolt means to retain the closure upon the container to compress the coil spring, and a fusible nut on the bolt to release the bolt in response to the thermal action of the propellant thus to jettison the container from the rocket; and detonator activating means responsive to the jettisoning action of said mechanism to ignite the detonator.

2. A booster for a rocket or the like of the class in which the booster is jettisoned after completion of its take off assistance comprising a frangible plastic container; a ceramic liner for the container, the liner being adapted to insulate the container from the heat of the propellant when the latter is under combustion; an explosive cord spirally arranged within the wall of the container along its length adapted to fracture the container into small pieces; and a fuse to ignite the cord.

3. A rocket booster of the class which is jettisoned from the rocket after completion of its take off assistance comprising a container to carry a charge of propellant, means disposed in the wall of the container along its length to produce an explosion to destroy the container after the latter has been jettisoned, and a detonator for such explosive means.

4. A rocket booster of the class which is jettisoned from the rocket after completion of its take off assistance comprising a container of resinous plastic to carry a charge of propellant, an explosive cord spirally arranged within the wall of the container along its length to explode to destroy the container, and a detonator to ignite the cord.

References Cited in the file of this patent

UNITED STATES PATENTS

| 58,646 | Hunt | Oct. 9, 1866 |
| 1,299,217 | Pain | Apr. 1, 1919 |
| 1,567,267 | Hitt | Dec. 29, 1925 |
| 2,506,976 | Tharratt | May 9, 1950 |

FOREIGN PATENTS

| 118,180 | Great Britain | Aug. 22, 1918 |
| 1,098,880 | France | Mar. 9, 1955 |